(12) United States Patent
Stewart

(10) Patent No.: US 6,781,987 B1
(45) Date of Patent: Aug. 24, 2004

(54) METHOD FOR PACKET TRANSMISSION WITH ERROR DETECTION CODES

(75) Inventor: Gilbert Mark Stewart, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/419,852

(22) Filed: Oct. 19, 1999

(51) Int. Cl.$^7$ .............................. H04J 3/06; G06F 11/10
(52) U.S. Cl. ...................... 370/389; 370/511; 370/513; 375/366; 714/753; 714/776; 714/777
(58) Field of Search ................................. 370/242, 244, 370/389, 394, 503, 509, 510, 511, 512, 513, 470, 471, 474; 375/365, 366; 714/752, 753, 755, 776, 777

(56) References Cited

U.S. PATENT DOCUMENTS

| | | | | |
|---|---|---|---|---|
| 4,393,502 A | * | 7/1983 | Tanaka et al. | 371/40 |
| 4,607,367 A | * | 8/1986 | Ive et al. | 371/37 |
| 4,696,007 A | * | 9/1987 | Moriyama | 714/752 |
| 4,744,086 A | * | 5/1988 | Komly et al. | 371/40 |
| 4,745,593 A | | 5/1988 | Stewart | 370/15 |
| 6,483,845 B1 | | 11/2002 | Takeda et al. | |
| 6,542,470 B1 | | 4/2003 | Honig et al. | |

OTHER PUBLICATIONS

John G. Proakis, Digital Communications, 1983, pp. 58–62 Mc–Graw Hill, Inc., USA.
R.C.V Macario, Cellular Radio Principles and Design, 1997 pp. 107, 2nd edition, McGraw–Hill, Inc., USA.

* cited by examiner

Primary Examiner—Alpus H. Hsu

(57) ABSTRACT

A method is provided for transmission of packets (102) as a sequence of data packets (104). A redundancy or check word (106) is composed for each packet of the sequence of data packets. A transmission packet is composed of a packet, a check word of a prior packet in the sequence of packets, and a check word of a subsequent packet in the sequence of packets. The transmission packets are transmitted in a sequence and received in a sequence. After reception, the transmission packets are separated so that the packets are compared with the corresponding check words transmitted with adjacent packets in the sequence.

16 Claims, 1 Drawing Sheet

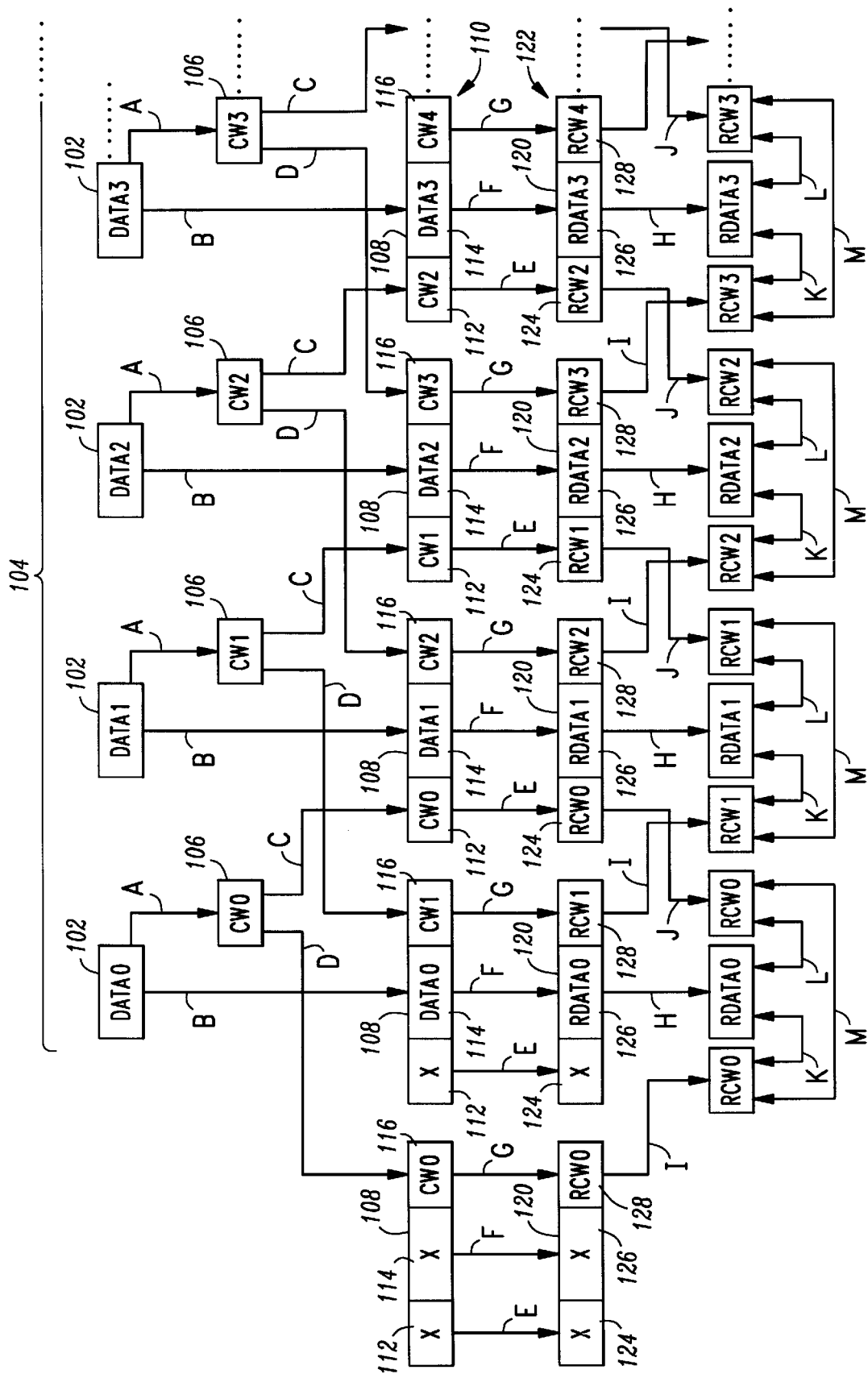

METHOD FOR PACKET TRANSMISSION WITH ERROR DETECTION CODES

FIELD OF THE INVENTION

The present invention relates generally to packet transmission in a telecommunications network, and in particular, to a method for transmission of packets of data employing redundancy bits for error detection and correction.

BACKGROUND OF THE INVENTION

With the advent of the Internet and other data communications, the need for packet switching has grown tremendously. With packet switching, messages that are to be delivered between two parties are divided into discrete portions called packets and then each packet is transmitted independently. When the packets arrive at the destination, the packets are compiled into the original message. Many protocols for data communications and Internet connection use packet transmission technologies, including TCP/IP and X.25.

As in other communication systems, noise is a problem for transmission of packets. In particular, spiky noise or noise of a short duration may be a problem in a packet transmission system. To detect errors caused by spiky noise, some packet transmission systems use a cyclic redundancy check (CRC) code for detecting errors in transmitted packets. More specifically, a CRC code is computed by a transmitter and appended to a packet for transmission. A receiver of the packet recomputes an expected CRC and compares it to the received CRC to determine if there were errors in transmission. Using the CRC in this capacity limits the ability to detect errors and make the packet transmission system robust. More specifically, error correction is not accomplished with the CRC and only errors associated with the single packet are detected based on the CRC.

Therefore, a need exists for a more robust method of detecting and correcting errors in packet transmission.

SUMMARY OF THE INVENTION

In accordance with the present invention, a method is provided for transmission of data packets. According to the method, a check word is composed for each packet of a sequence of packets. Preferably, the check word is a Hamming code of a predetermined length that is selected in a manner to detect and correct bit errors in the packets. After determining a check word for each packet, a transmission packet corresponding to each packet of the sequence of packets is composed. Each transmission packet includes the packet data as well as two check words. The first check word corresponds to a check word for the packet that precedes the current packet in the sequence of packets. The second check word corresponds to a check word for the packet that follows the current packet in the sequence of packets. In other words, each transmission packet contains a check word for the adjacent, prior packet in the sequence and a check word for the adjacent, subsequent packet in the sequence. The transmission packets form a sequence corresponding to the sequence of packets. The sequence of transmission packets is transmitted over a communications channel.

The sequence of transmission packets are sent over a communications channel and received as a sequence of received transmission packets. The received transmission packets include a first check word and a second check word, both corresponding to the first and second check words, respectively, from the original transmission packets. As the transmission packets are received in sequence, the received check words, which relate to packets that are separately received, are compared with the corresponding packets to determine if there were errors in transmission. More specifically, the packet portion of a received transmission packet is compared with a second check word of an adjacent prior received transmission packet in the sequence. Based upon the comparison, errors are detected and preferably corrected. Similarly, a first check word of a received transmission packet is compared with a packet portion of an adjacent prior received transmission packet in the sequence. Based upon the comparison, errors in transmission are detected and preferably corrected. Most preferably, rather than include a sequence number indicating the order of the packets, the transmission packets use the check word to verify the sequence in which the packets are received. Since each check word is transmitted twice, that is, before its corresponding data packet and after its corresponding data packet, errors that are short in duration are readily detected.

Additionally, the size of the check word is varied dynamically depending upon the importance of the data being transmitted and any perceived characteristics of the communications channel. In particular, the size of the check word is increased for noisy channels and decreased for channels with less noise. The noise level of a channel is determined by sending a plurality of sample messages and determining a noise level based on the error rate associated with the sample messages. The noise level is also determined by a number of retransmission packets requested by a receiver. And, a receiver may transmit an adjustment indication to a transmitter to indicate that the check word should be increased or decreased for noisier and quieter channels, respectively.

BRIEF DESCRIPTION OF THE DRAWINGS

FIG. 1 is a diagram illustrating the formation, transmission, receiving and error detection and correction of packets in accordance with a preferred embodiment of the present invention.

DETAILED DESCRIPTION OF THE PREFERRED EMBODIMENTS

FIG. 1 illustrates, by example, a preferred embodiment in accordance with the present invention. Discrete portions of data are organized into packets 102. Packets 102 are organized into a sequence to form a sequence of packets 104. Though only four data packets, DATA0 through DATA3, are shown in FIG. 1, the number of data packets 102 is not limited. Packets 102 are of any desirable length and are preferably each of the same fixed length. Alternatively, packets 102 vary in length. For example, packets 102 may all be of length 128 bits or DATA0 may be of 56 bits, while DATA1, DATA2 and DATA3 are 100 bits, 128 bits and 256 bits, respectively.

Each packet 102 is used to create a check word 106, as illustrated by arrow A. Check word 106 is preferably a block code that is a function of the content of the corresponding packet 102. Most preferably, check word 106 is a Hamming code derived from a transformation of packet 102. Alternatively, check word 106 is created by parity generation, look up tables, or a combination of these. Check word 106 is of any length. Preferably, check word 106 is of a minimum length to detect single-bit errors and double-bit errors in packet 102 and correct single-bit errors in packet 102. In one embodiment, packet 102 is divided into a combination of words, such as byte-sized words and check word 106 is composed of a plurality of check words corresponding to each byte of packet 102. Error detection and correction may be employed across 32-bit sized words to detect and correct errors in a manner known to those of skill in the art.

After check words 106 are composed for packets 102, a transmission packet 108 is formed corresponding to each packet 102. More specifically, appending data from packet 102 with two certain check words 106 forms each transmission packet 108. Transmission packet 108 includes a first check word 112, data portion 114 and a second check word 116. Transmission packets 108 form a sequence of transmission packets 110. In accordance with the invention, data portion 114 of transmission packet 108 is formed by the data from packet 102, as illustrated by arrow B. First check word 112 of transmission packet 108 is formed by a check word for the adjacent packet 102 in the sequence 104. For example, the transmission packet 108 containing DATA1 as data portion 114 includes check word CW0 as first check word 112. Check word CW0 corresponds to the check word created based on DATA0, which precedes DATA1 in sequence 104. The second check word 116 of transmission packet 108 contains a check word corresponding to the packet 102 that is subsequent to the packet portion 114 of transmission packet 108. For example, for the transmission packet 108 containing DATA1 as data portion 114, check word CW2, which corresponds to DATA2, forms the second check word 116. The formation of the first check word is illustrated in FIG. 1 by arrow C and the formation of the second check word 116 is shown in FIG. 1 by arrow D.

The transmission packets 108 group the data of a packet, not with a block code associated with the data, but rather with two block codes associated with the preceding packet data and subsequent packet data. The transmission packets are formed with the latency required to associate the check words with the packets as described above. Once a transmission packet is formed, it is ready for transmission over a communication channel.

A receiver receives a sequence 122 of received transmission packets 120. The received transmission packets are the transmitted sequence 110 plus any corruption caused by transmission over the communications channel. More specifically, each received transmission packet 120 comprises a received first check word 124, a received data portion 126 and a received second check word 128. As shown by arrows E, F and G respectively, each first check word, data portion, and second check word corresponds with a transmitted first check word, data portion and second check word. For example, check word CW0 corresponds to received check word RCW0; data portion DATA1 corresponds to received data portion RDATA1; and check word CW 2 corresponds to received check word RCW 2.

Upon receiving the received transmission packets, a receiver, in accordance with the present invention, sorts each received check word for comparison with a corresponding data word. More specifically, the two check words associated with a received packet are compared with the received packet as illustrated by arrows K and L. For example, received data word RDATA0 is compared with received check word RCW0, as illustrated by arrow K. In this case, the data portion 126 is compared with a check word from a next prior received transmission packet in the sequence. Also, received data word RDATA0 is compared with received check word RCW0, as illustrated by arrows L. In this case, the received data word RDATA0 is compared with a check word RCW0, that is transmitted with a transmission packet that is next subsequent to the packet transmitting the received data RDATA0. Optionally, the check words are compared with each other. That is, a first received check word is compared with the second received version of the same check word. For example, RCW0 is compared with RCW0, as illustrated by arrow M.

The comparisons made at the receiver between a packet and its check words are analogous to the transformation used to generate the check word. In other words, the inverse of the generation of the check word is performed. This preferably entails parity checking, a look-up table, or a combination of these. A comparison of a first received version of a check word to a subsequently received version of the check word, of course, is made directly, since the check words should be the same. If a comparison fails, an error, presumably, in transmission is detected. Depending on the relation of the check word to the packet, some errors are preferably corrected.

According to the invention, the size of the check word is preferably varied depending upon the importance of the data being transmitted and any perceived characteristics of the communications channel. For example, bit errors in video or audio data are not critical, but a bit error in a software program may be fatal. Hence, content of the data is a consideration for sizing the check word. Preferably, the size of the check word is increased for noisy channels and decreased for channels with less noise. The noise level of a channel is preferably determined by sending a plurality of sample messages and determining a noise level based on the error rate associated with the sample messages. The noise level is also determined by a number of retransmission packets requested by a receiver. And, a receiver may transmit an adjustment indication to a transmitter to indicate that the check word should be increased or decreased for noisier and quieter channels, respectively. In particular, it is important for a receiver to transmit an adjustment indication, since some errors that are corrected and do not result in retransmissions are otherwise not known at a transmitter.

As described above, redundancy bits are generated for a packet of data prior to transmission of the packet of data. The redundancy bits are included with two adjacent packets, a preceding and a subsequent packet, for transmission. By linking the adjacent packets with redundancy bits, a sequence number, nominally associated with a packet is not needed. Also, a cyclic redundancy check word nominally associated with a packet is advantageously replaced by the redundancy bits, which preferably, allow for detection and correction of bit errors.

In addition, the size of the check word is dynamically varied at any interval in transmission. The size of the check word is chosen based on the likelihood of error and the severity of the error to the application. The check words allow for reconstruction of a corrupt packet at a receiver, rather than retransmission by a transmitter. The reduction in retransmissions is especially advantageous in broadcast communications systems employing a single or few transmitters and many receivers that are capable of requesting retransmissions.

The invention being thus described, it will be evident that the same may be varied in many ways. Such variations are not to be regarded as a departure from the spirit and scope of the invention and all such modifications are intended to be included within the scope of the appended claims.

What is claimed is:

1. A method for transmission of data packets comprising the steps of:

A) determining a check word for each packet of a sequence of packets;

B) composing a transmission packet for each packet of the sequence of packets to produce a sequence of transmission packets, wherein each transmission packet of the sequence of transmission packets includes a packet of the sequence of packets, a first check word for a next prior packet in the sequence of packets and a second check word for a next subsequent packet in the sequence of packets, wherein the first check word is a don't care check word if there is no next prior packet, wherein the second check word is a don't care check word if there is no next subsequent packet, and wherein the don't care check word is any word; and C) transmitting the sequence of transmission packets.

2. The method of claim 1 wherein the check word is a Hamming code for each packet.

3. The method of claim 1 further comprising the steps of:

D) receiving the sequence of transmission packets to produce a sequence of received transmission packets;

E) comparing a packet of a received transmission packet of the sequence of received transmission packets with a second check word of a next prior received transmission packet of the sequence of received transmission packets to determine errors in transmission, wherein the next prior received transmission packet is adjacent to, and precedes, the received transmission packet in the sequence of received transmission packets.

4. The method of claim 3 further comprising the step of:

F) comparing a first check word of the received transmission packet with a packet of the next prior received transmission packet to determine errors in transmission.

5. The method of claim 3 further comprising the step of:

F) correcting an error in the packet of the received transmission packet in response to the step of comparing the packet with the second check word of the next prior received transmission packet.

6. The method of claim 1 wherein each packet of the sequence of packets is of a predetermined size.

7. The method of claim 6 wherein the check word for each packet of the sequence of packets is of a predetermined size.

8. The method of claim 6 wherein a size of the check word for each packet of the sequence of packets is determined dynamically based on importance of each packet of the sequence of packets.

9. The method of claim 6 wherein a size of the check word for each packet of the sequence of packets is determined based on a noise level of a channel used to transmit the sequence of transmission packets.

10. The method of claim 9 wherein the noise level is determined by a number of retransmission packets requested.

11. The method of claim 9 wherein the noise level is determined by sending a plurality of sample packets in the sequence of packets and determining errors associated with a plurality of received transmission packets of the sequence of received transmission packets corresponding to the plurality of sample packets.

12. The method of claim 1 wherein each transmission packet of the sequence of transmission packets does not include a sequence number.

13. The method of claim 6 wherein a size of the check word for each packet of the sequence of packets is determined based on an adjustment indicator sent from a receiver of the sequence of received transmission packets.

14. A method for transmission of data packets comprising the steps of:

determining a check word for each packet of a sequence of packets;

composing a transmission packet for each packet of the sequence of packets to produce a sequence of transmission packets, wherein each transmission packet of the sequence of transmission packets includes a packet of the sequence of packets, a first check word for a prior packet in the sequence of packets and a second check word for a subsequent packet in the sequence of packets, wherein the first check word is a don't care check word if there is no prior packet, wherein the second check word is a don't care check word if there is no subsequent packet and wherein the don't care check word is any word; and transmitting the sequence of transmission packets.

15. The method of claim 14 wherein the check word is a Hamming code for the each packet.

16. The method of claim 14 further comprising the steps of:

receiving the sequence of transmission packets to produce a sequence of received transmission packets;

comparing a packet of a received transmission packet of the sequence of received transmission packets with a second check word of a prior received transmission packet of the sequence of received transmission packets to determine errors in transmission, wherein the prior received transmission packet precedes the received transmission packet in the sequence of received transmission packets.

* * * * *